(12) United States Patent
Kringlebotn et al.

(10) Patent No.: US 7,171,093 B2
(45) Date of Patent: Jan. 30, 2007

(54) METHOD FOR PREPARING AN OPTICAL FIBRE, OPTICAL FIBRE AND USE OF SUCH

(75) Inventors: Jon Thomas Kringlebotn, Trondheim (NO); Audun Hordvik, Trondheim (NO)

(73) Assignee: Optoplan, AS, Trondheim (NO)

( * ) Notice: Subject to any disclaimer, the term of this patent is extended or adjusted under 35 U.S.C. 154(b) by 191 days.

(21) Appl. No.: 10/480,374

(22) PCT Filed: Jun. 11, 2002

(86) PCT No.: PCT/NO02/00205

§ 371 (c)(1),
(2), (4) Date: Jun. 14, 2004

(87) PCT Pub. No.: WO02/100794

PCT Pub. Date: Dec. 19, 2002

(65) Prior Publication Data

US 2004/0234221 A1 Nov. 25, 2004

(30) Foreign Application Priority Data

Jun. 11, 2001 (NO) ................................. 20012869

(51) Int. Cl.
*G02B 6/02* (2006.01)
*G02B 6/34* (2006.01)
*G02B 6/36* (2006.01)

(52) U.S. Cl. ............................ 385/128; 385/37; 65/430

(58) Field of Classification Search .................. 65/385, 65/413, 430, 432; 385/12, 37, 129, 128; 250/227.14, 227.18

See application file for complete search history.

(56) References Cited

U.S. PATENT DOCUMENTS

| 4,727,237 A | 2/1988 | Schantz ...................... 219/121 |
| 5,000,541 A | 3/1991 | DiMarcello et al. ....... 350/96.3 |
| 5,828,059 A | 10/1998 | Udd ...................... 250/227.18 |
| 5,841,131 A | 11/1998 | Schroeder et al. ..... 250/227.17 |
| 5,844,927 A | 12/1998 | Kringlebotn ................... 372/6 |
| 5,925,879 A | 7/1999 | Hay ...................... 250/227.14 |

(Continued)

FOREIGN PATENT DOCUMENTS

NO        19976012        12/1997

(Continued)

OTHER PUBLICATIONS

International Preliminary Examination Report, Based on PCT/NO02/00205, Dated Sep. 29, 2003.

(Continued)

*Primary Examiner*—Sung Pak
*Assistant Examiner*—Daniel Petkovsek
(74) *Attorney, Agent, or Firm*—Patterson & Sheridan, LLP

(57) ABSTRACT

Methods for coating an optical fiber with optical fiber Bragg grating (FBG) with a hermetic coating, particularly a coating of carbon, are employed to avoid ingress of gases, vapors or fluids in the ambient environment. This ingress can be from water or hydrogen, which can diffuse in the fiber glass and cause deviation/drift in the measured Bragg measurements. Bragg gratings that maintain the grating strength at temperatures in excess of 1000° C. are used and can be formed by heating the fiber above 1000° C. in a chamber with a reactive gas that produces deposition of carbon.

20 Claims, 1 Drawing Sheet

U.S. PATENT DOCUMENTS 6,029,476 A    2/2000  Bourhis et al. ............... 65/413
6,442,304 B1 * 8/2002  Crawley et al. .............. 385/12
6,817,257 B2 * 11/2004 Kluth et al. ............... 73/866.5

FOREIGN PATENT DOCUMENTS

WO    WO 98/12586    3/1998
WO    WO 99/32863    7/1999

OTHER PUBLICATIONS

International Search Report, Based on PCT/NO02/00205, Dated Sep. 11, 2002.

Clowes, J.R., et al., IEE Photonics Technology Letters, vol. 10, No. 3, 1998, "Effects of High Temperature and Pressure on Silica Optical Fiber Sensors."

* cited by examiner

METHOD FOR PREPARING AN OPTICAL FIBRE, OPTICAL FIBRE AND USE OF SUCH

The invention relates to a method for coating an optical fibre as stated in the introductory part of claim 1, as well as an optical fibre manufactured by this method, and a use of such an optical fibre.

BACKGROUND

A fibre Bragg grating (FBG) is a permanent periodic refractive index modulation in the core of a single-mode optical silica glass fibre over a length of typically 1–100 mm. It can be created in a photosensitive fibre by transversely illuminating the fibre with a periodic interference pattern generated by ultra-violet (UV) laser light. The refractive index modulation in a standard FBG is believed to form by UV induced breaking of electronic bonds in Ge-based defects, releasing electrons which are re-trapped at other sites in the glass matrix. This causes a change in the absorption spectrum and in the density, and thereby a change in the refractive index of the glass. An FBG reflects light within a narrow bandwidth (typically 0.1–0.3 nm), centred at the Bragg wavelength, $1B=2$ neffL, where neff is the effective refractive index seen by the light propagating in the fibre, and L is the physical period of the refractive index modulation. It is known that the reflected Bragg wavelength from an FBG will change with any external perturbation which changes the effective refractive index seen by the propagating light and/or the physical grating period (fibre length), such as temperature and strain. By measuring the reflected Bragg wavelength, using for example a broadband light source and a spectrometer, an FBG can be used as a sensor for measuring such external perturbations. A standard UV induced FBG can be made thermally stable up to ca. 300–400° C., at higher temperatures the UV-induced refractive index modulation will decay fast and the grating will be erased.

It is possible to make so-called chemical FBGs which can survive temperatures up to 1100–1200° C. [Fokine, M., Sahlgren, B. E., and Stubbe, R., "High temperature resistant Bragg gratings fabricated in silica optical fibres," ACOFT-96, post-deadline-paper, 1996, Sidney, Australia and PCT patent application WO 98/12586 to Fokine]. A chemical grating is typically formed by first writing a standard grating in hydrogen loaded, fluorine (F) co-doped, Ge-doped silica fibres. UV exposure of such a fibre creates OH in the illuminated regions of the fibre which through heating reacts with F to form HF. Post-annealing at temperatures >1000° C. causes the HF to diffuse out of the fibre core, leaving UV-exposed areas more depleted of F than unexposed areas, producing a spatially varying F-concentration and hence a refractive index variation (grating). It is also possible to make other types of special FBGs, which can survive high temperatures, such as type II FBGs [W. X. Xie et.al., Opt. Commun. 1993, Vol. 104, pp. 185–195]. It is known that type II FBGs in germanium-free nitrogen-doped silica-core fibres are much more stable at elevated temperatures than standard type I FBGs [E. M. Dianov et.al., Electron. Lett., Vol. 33, pp. 236–237, 1997].

Several FBGs can be wavelength multiplexed along one fibre, making them very attractive for distributed measurements of strain and temperature. FBGs can also be used as a pressure sensor by measuring the shift in Bragg wavelength caused by hydrostatic pressure induced compression of the silica glass fibre [Xu, M. G., Reekie, L., Chow, Y. T., and Dakin, J. P., "Optical in-fibre grating high pressure sensor, Electron. Lett., Vol. 29, pp. 398–399, 1993]. This provides a very simple sensor design with small dimensions and good reproducibility and long-term stability provided by the all-silica construction of the sensor. An all-fibre FBG sensor with enhanced pressure sensitivity and inherent temperature compensation can be made by using a passive or an active (fibre laser) FBG written in a birefringent side-hole fibre, which has two open channels symmetrically positions at each side of the fibre core, [Udd, E., U.S. Pat. Nos. 5,828,059 and 5,841,131, Kringlebotn, J. T., Norwegian patent application 19976012 (passive FBG sensors) and Kringlebotn, J. T., U.S. Pat. No. 5,844,927 (active FBG sensor)]. It is also possible to make FBG pressure sensors with enhanced pressure sensitivity by using a glass transducer element surrounding the optical fibre, either to convert pressure to strain/compression in the fibre or to convert pressure to fibre birefringence [Udd, E., U.S. Pat. No. 5,841,131].

When fibre-optic sensors are operated under conditions of high temperature, such as in oil wells, there might be considerable drift effects both in FBG and birefringent interferometric sensors, as taught us by J. R. Clowes et.al. in "Effects of high temperature and pressure on silica optical fibre sensors," IEEE Photon. Technol. Lett., Vol. 10, pp. 403–405, 1998. The drift effect occurs when the fibre is surrounded by a liquid, such as water or oil, and increases with increasing temperature. The effect is believed to be due to ingress of liquid molecules into the outer layers of the fibre cladding resulting in the development of a highly stressed layer and consequently a tensile stress on the fibre core. This increases the optical path length of a fibre and changes the Bragg wavelength of an FBG. This effect will also change the birefringence of a highly-birefringent fibre. Clowes et.al. demonstrated that the increase in optical path length of a fibre was reduced by an order of magnitude using a hermetic, carbon coated fibre.

In addition, diffusion of gases, such as hydrogen, into the fibre, will cause a change in the refractive index proportional to the hydrogen concentration, and consequently drift in Bragg wavelength of an FBG written into the core of the fibre, as disclosed by Malo et.al. in "Effective index drift from molecular hydrogen diffusion in hydrogen-loaded optical fibres and its effect on Bragg grating fabrication," Electronics Letters, Vol. 30, pp. 442–444, 1994. Hydrogen will also cause a loss increase in an optical fibre, which could be detrimental for FBG-based rare-earth doped fibre lasers. Finally, diffusion of gases into the holes of a side-hole fibre will change the pressure inside the holes, and hence the pressure difference which affects the measurement of the external hydrostatic pressure.

As disclosed by Kringlebotn in Norwegian patent application 19976012 a practical all-fibre FBG pressure sensor without drift at high-temperature operation can be realised by recoating an FBG in a side-hole fibre with a hermetic coating to prevent penetration of gases, vapours or liquids from the surrounding environment. However, there is no mentioning of how such a coating can be applied on an FBG.

A. Hay [U.S. Pat. No. 5,925,879] discloses the use of a carbon coating, or another hermetic coating on an FBG sensor to protect the optical fibre and sensors from a harsh environment.

Carbon has been shown to provide a good hermetic coating for optical fibres, making them essentially impermeable to both water and hydrogen, maintaining the mechanical strength and low loss of the fibre. A carbon coating can be applied to an optical fibre during the drawing process before the fibre glass cools through a pyrolytic process [see for example U.S. Pat. No. 5,000,541 to DiMarcello et.al.]. Carbon coating using a similar technique can also be applied to splices between hermetic fibres to maintain hermeticity after splicing of carbon coated fibres [U.S. Pat. No. 4,727,237 to Schantz, C. A., et.al.]. In the latter patent a pyrolytic technique is used based on heating the fibre splice region with a CO2-laser inside a chamber containing a reactant gas causing a carbon coating to form on the glass surface by pyrolysis of the reactant gas. The temperature in the fibre will during such a process typically exceed 1000° C. This high temperature pyrolytic process have been shown to provide highly hermetic coatings, and seems to be the preferred technique for carbon coating of optical fibres. However, a standard FBG, i.e. a so-called type-I FBG in a germanium-doped silica fibre cannot be carbon coated using such a process, since it will be erased at the high temperature involved.

OBJECTS

The main object of the invention is to provide a method for recoating an FBG in a fused silica optical fibre, or an FBG embedded in a fused silica glass element, with a hermetic carbon coating to prevent in-diffusion of molecules from the surrounding liquid or gas into the glass at elevated temperatures, hence eliminating or reducing drift in the Bragg wavelength of the FBG. This is of particular importance for FBG based temperature, strain and pressure sensors operated at elevated temperatures, for example in oil-wells, in refineries or in industrial processing applications. It is an object to provide a practical all-fibre pressure and temperature sensor for use in such applications. It is further an object to provide a method that prevents loss in FBGs, resulting from indiffusion of hydrogen. Finally it is an objective that the method maintains the mechanical strength of the fibre or glass element and maintains the grating strength (grating reflectivity).

THE INVENTION

The object of the invention is achieved with a method having features as stated in the characterising part of claim 1. Further features are stated in the dependent claims. The method consists of using a high temperature carbon coating technique on a special fibre Bragg gratings which can survive and maintain their grating strength (reflectivity) at elevated temperatures, typically in excess of 1000° C. These gratings can be so-called chemical gratings, i.e. a gratings consisting of a variation in the chemical composition along the grating. A The chemical grating can be created in a suitable hydrogen loaded optical fibre, typically a germanium, fluorine co-doped silica fibre, where the fibre can be a low-birefringent fibre or a highly birefringent fibre such as a side-hole fibre. The grating can also be other types of special high temperature gratings, such as type II gratings, for example in germanium-free nitrogen-doped silica fibres. The high temperature carbon coating technique will typically be a pyrolytic technique based on heating the fibre in a chamber containing a reactant gas causing a carbon coating to form on the glass surface by pyrolysis of the reactant gas.

The carbon coated FBG should be coated with a second protective coating which protects the carbon mechanically and prevents the carbon from burning off at elevated temperatures. This secondary coating can be a polyimide, silicone or acrylate coating, or a thin metal coating such as gold.

The carbon coating process can be combined with the high temperature annealing process needed to create the chemical gratings so that heating the fibre inside a chamber containing a reactant gas both creates the chemical grating and causes a deposition of a carbon coating on the glass surface. This reduces the number of processing steps and minimises fibre handling, providing a high mechanical strength of the grating. The secondary recoating process can also be incorporated inside the chamber by putting the carbon coated fibre in a mould filled with the coating material and heating this with an internal heater to cure the coating material and form a suitable coating.

A particular use of an optical fibre according to the invention is stated in claim 12. Further, a particular embodiment of an optical fibre according to the invention is stated in claim 13.

EXAMPLES

In the following, the invention will be described with reference to illustrations, where FIG. 1 shows the cross-section of a chemical FBG written in a side-hole fibre with a carbon coating and a secondary polyimide coating.

Figure 1:
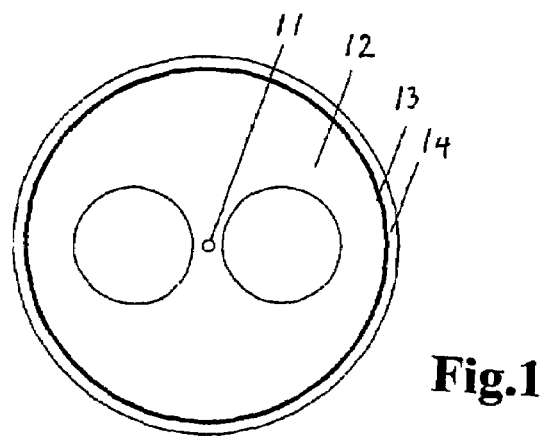
FIG. 1 shows the cross-section of a chemical FBG in the core (11) of a side-hole fibre (12) with a carbon coating (13) formed by a pyrolytic process and a secondary polyimide coating (14) to protect the carbon coated FBG.
Figure 2:
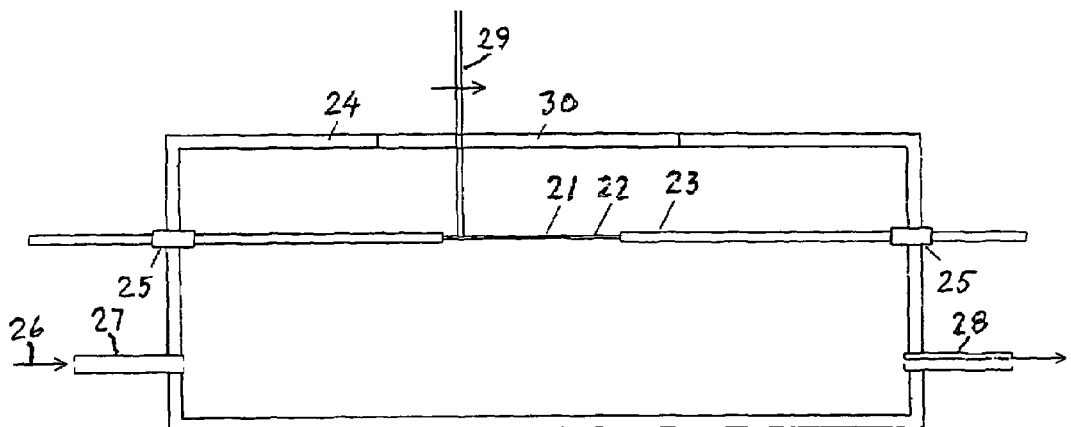
FIG. 2 is a schematic illustration of a chamber for recoating a high temperature FBG with carbon.

FIG. 2 is a schematic illustration of a chamber for recoating a high temperature FBG, such as a grating, with carbon, A chemical high temperature grating (21) in a stripped section (22) of an optical fibre (23) is placed inside a sealed chamber (24). The fibre is entering and exiting the chamber through pressure seals/penetrators (25). A gas mixture (26) of a reactive gas, for example acetylene, and nitrogen is entering the chamber through an inlet (27) and leaving through an outlet (28), creating a gas flow with a slight over-pressure inside the chamber keeping other gases out. The fibre is heated by a scanning $CO_2$-laser beam (29) going into the chamber through a transmitting window (30).

Figure 3:
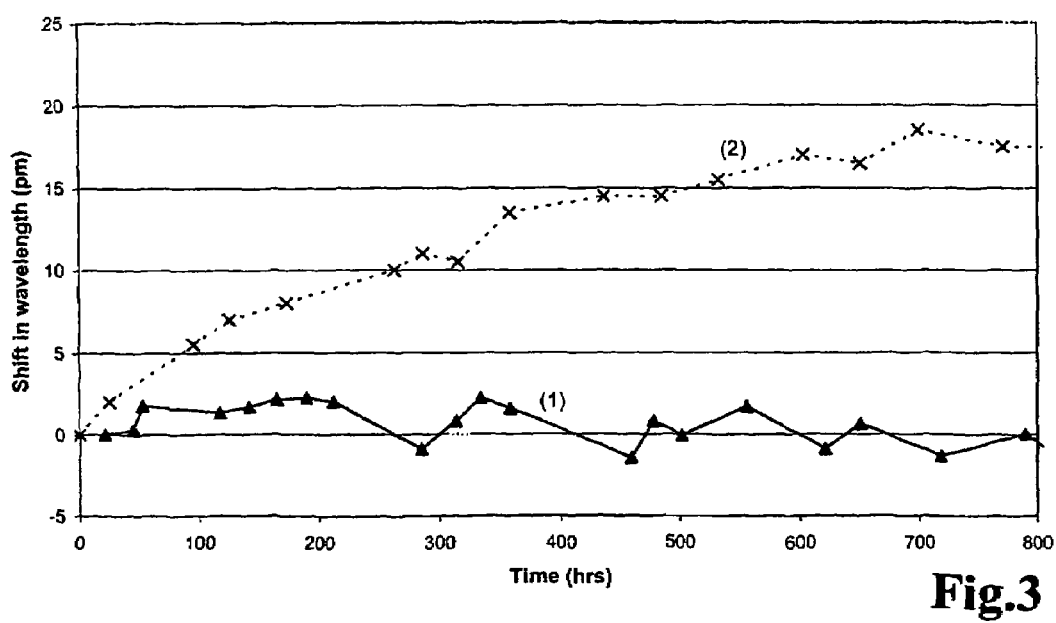
FIG. 3 shows the long-term drift in Bragg wavelength of a chemical FBG exposed to silicon oil at 200° C., both with and without carbon recoating.

FIG. 3 shows the long-term drift in Bragg wavelength of a chemical FBG exposed to silicone oil at 200° C., with (1) and without (2) a carbon coating, showing that a carbon coating eliminates the wavelength drift in such an environment, believed to be due to stress changes in the fibre caused by ingress of molecules from the surrounding oil into the outer layers of the fibre cladding.

The invention claimed is:

1. A method of providing a hermetically protected fiber optic Bragg grating (FBG) to limit ingress by diffusion into optical fiber glass of fluid from a surrounding environment, comprising:

writing a Bragg grating into an optical fiber, wherein the Bragg grating maintains its strength at temperatures in excess of 1000° C.; and forming a hermetic coating on the optical fiber with a process that includes heating of the optical fiber.

2. The method according to claim 1, wherein writing the Bragg grating comprises:

inscribing a precursory Bragg grating into the optical fiber by illumination with ultraviolet light; and thereafter heating the optical fiber to form the Bragg grating having a periodic chemical variation in composition along the optical fiber with a corresponding periodic variation in refractive index due to components of the optical fiber being gassed/diffused out of the optical fiber thereby producing a refractive index variation.

3. The method according to claim 2, wherein a single heating process is used for heating of the optical fiber while forming the hermetic coating and heating the optical fiber to form the Bragg grating.

4. The method according to claim 2, wherein the periodic chemical variation is formed in a hydrogen loaded, fluorine co-doped, germanium doped silica fiber that provides the optical fiber.

5. The method according to claim 1, wherein writing the Bragg grating and forming the hermetic coating are conducted simultaneously.

6. The method according to claim 1, wherein writing the Bragg grating includes writing the Bragg grating of type II.

7. The method according to claim 1, wherein writing the Bragg grating includes writing the Bragg grating of type II into a germanium-free nitrogen-doped silica fiber that provides the optical fiber.

8. The method according to claim 1, wherein forming the hermetic coating is a result of a pyrolytic process, the pyrolytic process including pyrolysis of a reactive gas causing formation of a carbon coating deposited on the optical fiber to provide the hermetic coating.

9. The method according to claim 8, further comprising coating the optical fiber with an additional coating to protect the carbon coating against mechanical damage and damage by heating.

10. The method according to claim 8, further comprising coating the carbon coating disposed on the optical fiber with an additional coating of polyimide, silicone or acrylate.

11. The method according to claim 8, further comprising coating the carbon coating disposed on the optical fiber with a thin metallic coating.

12. The method according to claim 8, wherein the reactive gas is acetylene.

13. The method according to claim 8, further comprising coating the carbon coating disposed on the optical fiber with a gold coating.

14. The method according to claim 1, wherein heating of the optical fiber is performed using a laser beam.

15. An optical sensor providing a hermetically protected fiber optic Bragg grating (FBG) to limit ingress by diffusion into optical fiber glass of fluid from a surrounding environment, comprising:
    an optical fiber having a Bragg grating written therein, wherein the Bragg grating maintains its strength at temperatures in excess of 1000° C.; and
    a pyrolytic hermetic coating formed on the optical fiber by heating of the optical fiber.

16. The optical sensor of claim 15, wherein the optical fiber is configured to provide temperature and hydrostatic pressure measurement.

17. The optical sensor of claim 16, wherein the coating is a carbon coating.

18. The optical sensor of claim 15, wherein the optical fiber is configured to provide hydrostatic pressure measurement.

19. The optical sensor of claim 18, wherein the optical fiber has a core and cladding with the Bragg grating written into the core and the cladding including two side-holes.

20. The optical sensor of claim 19, wherein the optical fiber is spliced in between standard single mode fibers, so that a change in pressure difference between the surrounding environment and the side-holes causes a change in the birefringence of the optical fiber and hence a change in wavelength difference between two reflection peaks of the grating according to each of two orthogonal polarized eigenmodes of the optical fiber.

* * * * *